July 8, 1947.  M. N. FAIRBANK  2,423,492
LENS MOUNTING
Filed Oct. 14, 1943
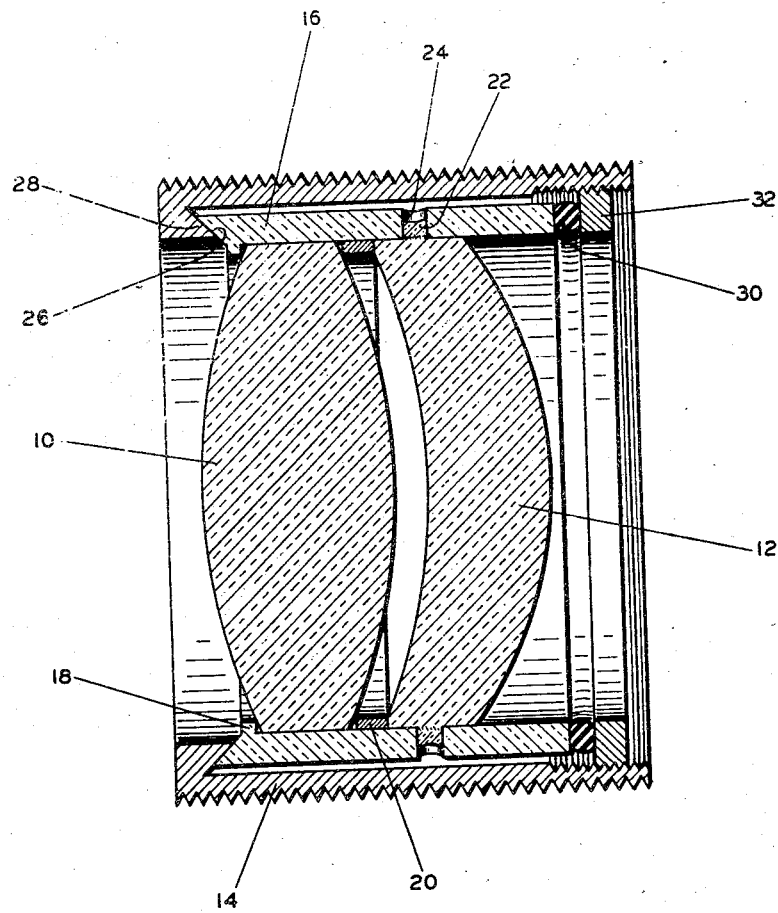
INVENTOR.
Murry N. Fairbank
BY Donald L. Brown
Attorney Patented July 8, 1947

2,423,492

UNITED STATES PATENT OFFICE 2,423,492

LENS MOUNTING

Murry N. Fairbank, Weston, Mass., assignor to Polaroid Corporation, Cambridge, Mass., a corporation of Delaware Application October 14, 1943, Serial No. 506,215

8 Claims. (Cl. 88—57)

This invention relates to optical apparatus and more particularly to means for mounting the lens element of an optical system.

It is one object of the present invention to provide a novel mounting for one or more lens elements of plastic whereby the latter may be contained in a housing, for example of metal or of a resin having a substantially different coefficient of thermal expansion from that of said plastic, without being distorted or decentered with changes in temperature.

Another object is to provide a novel means for mounting a plastic lens system in a housing having a high heat conductivity whereby the lenses are thermally insulated from said housing and are not subjected to the rapid temperature changes which the housing may undergo.

A further object is to provide novel means for mounting a lens in a housing whereby the axial position of said lens is automatically adjusted with changes in temperature so as to compensate, at least in part, for the effects of changes in temperature on the location of the focal surface of the lens.

A still further object is to provide a novel lens mount which may be readily constructed and assembled and which consists of a relatively few simple parts.

The above and other objects and novel features of this invention will more fully appear from the following detailed description when the same is read in connection with the accompanying drawing. It is to be expressly understood, however, that the drawing is for purpose of illustration only and is not intended as a definition of the limits of the invention, reference being primarily had for this latter purpose to the appended claims.

In the drawing there is shown an axial sectional view of an optical apparatus embodying the novel mounting of the present invention.

Referring to the drawing, there is illustrated novel means for mounting a lens, such for example as the object lens 10, 12 of a telescope, in a housing 14 formed from a material having a substantially different coefficient of thermal expansion from the material of said lens. Each of lens elements 10, 12 may be formed, for example, from an organic resin which is sufficiently transparent, homogeneous and hard to be used optically and which may be accurately cast by polymerization in molds. Examples of resins of this character are the methacrylic esters and the vinyl compounds, such as cyclohexyl methacrylate, styrene, methyl methacrylate, benzyl methacrylate, phenyl methacrylate, methyl methacrylate, alpha phenyl ethyl methacrylate, orthomethyl styrene, orthochlorostyrene, tetrahydrofurfuryl methacrylate and cyclohexylcyclohexyl methacrylate. Housing 14 may be formed from any conventional material suitable for housing purposes, such as a metal or a phenolic resin, materials from both of the latter classes having coefficients of thermal expansion which are substantially different from those of the polymerizable methacrylic esters and vinyl compounds. It is to be understood, however, that lenses, for example of glass, may also be mounted in accordance with the invention in housings or sleeves of materials having substantially different coefficients of thermal expansion.

In the form illustrated, the novel mounting means comprise a sleeve 16 of a material having substantially the same coefficient of thermal expansion as the material of lenses 10 and 12. Resins from the class consisting of methacrylic esters and vinyl compounds have coefficients of thermal expansion which are substantially alike so that if lenses 10, 12 are formed from a suitable pair of said resins, such for example as cyclohexyl methacrylate and styrene, any one of said resins may be satisfactorily used as the material for sleeve 16. To fix lenses 10, 12 in said sleeve, the latter is preferably provided with an internal flange or shoulder 18, against which lens 10 abuts, a spacer 20 being interposed between lenses 10 and 12 to separate the latter as desired. Lens 12 is rigidly secured to sleeve 16 as by a cement 22 which bonds the outer periphery of said lens to the inner wall of said sleeve. Cement 22 is preferably applied after lens 12 is operatively positioned in sleeve 16, as for example, by being poured in liquid form into a plurality of radial openings 24 in said sleeve to fill at least a portion of the annular space between said sleeve and said lens and being thereafter hardened or set.

For cyclohexyl methacrylate, methyl methacrylate, or styrene, or any combination of these materials, it has been found suitable to employ as cement 22 the vinyl acetate acetal mixture sold under the trade name "Alvar," the vinyl acetate sold under the trade name "Vinylite X," or the vinyl compound sold as "Mowillith N," said compounds being dissolved in a suitable solvent, such as methanol. Other suitable types of bonding agents or cements are the low melting point thermoplastic cements, such as the low melting point vinyl acetates or non-oxidizing alkyd resins, and plastics which are compatible with the plastics of the lens and the sleeve and which may be applied in an unpolymerized condition and hardened by polymerization in situ or in a polymerized condition in a suitable solvent, as for example styrene in ethyl acetate.

To mount the assembly comprising lens 10, 12 and sleeve 16 in housing 14 so that said sleeve is free for radial and axial expansion relative to said housing and yet has its expansion suitably restrained so that lens 10, 12 remains centered during said expansion, a peripheral clearance is provided between said housing and said sleeve and said sleeve has an inclined, i. e., a frusto-conical, end surface 26 which engages an internally extending flange 28 formed with said housing. The surface of said flange which is engaged by end surface 26 has an inclination or taper corresponding to that of the latter surface. Sleeve 16 is resiliently biased at its other end into engagement with flange 28 by suitable means, such as a gasket 30, for example, of rubber, said gasket being compressed between the end of said sleeve and a screw ring 32 threaded into housing 14. As shown, housing 14 is of the sleeve type, being externally threaded for mounting in a main housing, but it is to be understood that housing 14 could be an unthreaded, integral extension of a main housing.

In operation, as the temperature increases, lenses 10, 12 and sleeve 16 expand as a unit, the rate of expansion being greater than that of housing 14 so that said sleeve is moved radially outward relative to said housing. This relative radial expansion is substantially unrestrained because of the peripheral clearance between said sleeve and said housing and, therefore, does not set up any strains in lens elements 10 and 12. Gasket 30 permits axial expansion of said sleeve relative to said housing and also acts to maintain end surface 26 of said sleeve in engagement with flange 28 whereby said sleeve is maintained centrally disposed within said housing. Because of the inclination of the engaging surfaces of said sleeve and said housing, expansion of said sleeve also produces axial movement of the sleeve unit 10, 12, 16. By inclining surface 26, as shown, the direction of movement of said sleeve unit with increase in temperature is toward flange 28 and said movement is in an opposite direction to the movement of the focal plane of lens 10, 12 with increases in temperature. Accordingly, the mounting compensates at least in part for the effects of temperature on the focal length of said lens, i. e., athermalizes said lens at least partially for focal point. It will be understood that the axial displacement of sleeve 16 relative to flange 28 for a given temperature change will depend on the diameter of said sleeve and on the inclination of the engaging surfaces of said sleeve and said flange so that a predetermined athermalization for focal point may be obtained by controlling the slope of surface 26.

In a preferred embodiment of the invention, lenses 10 and 12 are approximately three inches in diameter and are formed, respectively, of cyclohexyl methacrylate and styrene. Sleeve 16 is formed of styrene and housing 14 is formed of aluminum. It has been found satisfactory in this embodiment to provide frusto-conical surface 26 of said sleeve with a taper or inclination of approximately 45° whereby a partial athermalization for focal point is achieved.

There is thus provided novel means for mounting lenses in a housing formed of a material having a substantially different coefficient of thermal expansion from the material of said lenses whereby the expansion of said lenses relative to the housing does not distort or decenter the lenses and whereby at least a partial automatic compensation is obtained for the effect of temperature changes on the focal point of the lens system.

It is to be understood that the mounting of the invention is not limited to an arrangement whereby the lens system is at least partially athermalized for focal point. Where athermalization is not of primary importance or where it is desired to magnify the change of focus with temperature, surface 26 may slope in the opposite direction or the inclined engaging surfaces may be provided at the other end of sleeve 16.

Since certain changes may be made in the above product and different embodiments of the invention could be made without departing from the scope thereof, it is intended that all matter contained in the above description shall be interpreted as illustrative and not in a limiting sense.

What is claimed is:

1. In apparatus of the character described, a lens comprising at least one lens element of plastic, a housing formed of a material having a substantially different coefficient of thermal expansion from that of said plastic, a sleeve wherein said lens is mounted, said sleeve being formed of a material having a coefficient of thermal expansion of the same order as that of said plastic, means operative when in engagement with said sleeve to mount said sleeve centrally in said housing and to translate radial expansion and contraction of said sleeve into axial movement of the latter relative to said housing, said means comprising a member rigidly secured to said housing and having a frusto-conical surface cooperating with a corresponding surface on said sleeve, and resilient means for maintaining said first-named means in operative engagement with said sleeve, said resilient means comprising a member of yielding material.

2. In apparatus of the character described, a lens comprising at least one lens element of plastic, a housing formed of a material having a substantially different coefficient of thermal expansion from that of said plastic, a sleeve wherein said lens is mounted, said sleeve being formed of a material having a coefficient of thermal expansion of the same order as that of said plastic, means operative when in engagement with said sleeve to mount said sleeve centrally in said housing, said means comprising a member rigidly secured to said housing and having a frusto-conical surface cooperating with a corresponding surface on said sleeve, and resilient means for maintaining said first-named means in operative engagement with said sleeve, said resilient means comprising a member of yielding material.

3. In apparatus of the character described, a lens comprising an element of cyclohexyl methacrylate and an element of styrene, a styrene sleeve wherein said lens is mounted, a metallic housing, means operative to mount said sleeve centrally in said housing, said means comprising a flange on said housing having a frusto-conical surface, said frusto-conical surface cooperating with a corresponding surface on one end of said sleeve, the inclination of said cooperating surfaces being such that radial expansion of said sleeve when said surfaces are in engagement produces axial movement of said sleeve in the direction of said flange, and resilient means engaging the other end of said sleeve and adapted to maintain said frusto-conical surfaces in engagement.

4. In apparatus of the character described, a lens comprising an element of cyclohexyl methacrylate and an element of styrene, a styrene sleeve, means comprising a plurality of resinous bonds for securing said lens in said sleeve, a metallic housing, means operative to mount said sleeve centrally in said housing, said means comprising a flange on said housing having a frusto-conical surface, said frusto-conical surface cooperating with a corresponding surface on one end of said sleeve, the inclination of said cooperating surfaces being such that radial expansion of said sleeve when said surfaces are in engagement produces axial movement of said sleeve in the direction of said flange, and resilient means engaging the other end of said sleeve and adapted to maintain said frusto-conical surfaces in engagement.

5. In apparatus of the character described, a lens comprising an element of cyclohexyl methacrylate and an element of styrene, a styrene sleeve, means comprising a plurality of resinous bonds for securing said lens in said sleeve, a housing of aluminum, means operative to mount said sleeve centrally in said housing, said means comprising a flange on said housing having a frusto-conical surface inclined at approximately 45° to the optical axis of said lens, said frusto-conical surface cooperating with a corresponding surface on one end of said sleeve, the inclination of said cooperating surfaces being such that radial expansion of said sleeve when said surfaces are in engagement produces axial movement of said sleeve in the direction of said flange, and resilient means engaging the other end of said sleeve and adapted to maintain said frusto-conical surfaces in engagement.

6. In apparatus of the character described, lens means comprising at least one plastic lens element, a housing for said lens means, said housing having a coefficient of thermal expansion substantially different from that of said plastic, means unconnected with said housing means and contained within the housing means whereby to carry the lens means as a unit, and means for slidably mounting the lens-carrying means in said housing for movement axially of said housing with temperature changes, said movement being opposite to the direction and in proportion to the magnitude of the movement of the focal plane of said lens means produced by said change in temperature.

7. In apparatus of the character described, a lens comprising at least one lens element of plastic, a housing formed of a material having a substantially different coefficient of thermal expansion from that of said plastic, a sleeve in which said lens is mounted and which is formed of a material having a coefficient of thermal expansion of the same order as that of said plastic, said sleeve being mounted within said housing and having a transverse dimension which is less than the greatest internal transverse dimension of said housing, and means in the housing engaging only the opposite end portions of said sleeve and mounting said sleeve in said housing substantially out of contact with the inner peripheral area of the housing and for sliding movement axially of the housing in accordance with temperature changes while predetermining the axial and central position of the sleeve relative to said housing for any given temperature.

8. In apparatus of the character described, a lens comprising at least one lens element of plastic, a housing formed of a material having a substantially different coefficient of thermal expansion from that of said plastic, a sleeve wherein said lens is mounted, said sleeve being formed of a material having a coefficient of thermal expansion of the same order as that of said plastic, and means for slidably mounting said sleeve in said housing for movement axially thereof in accordance with temperature changes while predetermining the axial and central position of the sleeve relative to said housing for any given temperature, said mounting means having means carried by the housing which engage opposite ends of said sleeve, said engaging means at one end of said sleeve resiliently maintaining the other end of said sleeve in pressure contact with the engaging means adjacent the last-mentioned end of said sleeve.

MURRY N. FAIRBANK.

REFERENCES CITED

The following references are of record in the file of this patent:

UNITED STATES PATENTS

| Number | Name | Date |
| --- | --- | --- |
| 1,325,936 | Fouasse | Dec. 23, 1919 |
| 2,240,827 | Bangert et al. | May 6, 1941 |
| 2,314,838 | Kingston | Mar. 23, 1943 |
| 2,330,663 | Bennett et al. | Sept. 28, 1943 |
| 1,417,326 | Jacobsson | May 23, 1922 |
| 2,245,257 | Crumrine | June 10, 1941 |
| 2,097,850 | Wallace | Nov. 2, 1937 |
| 1,722,520 | Glancy | July 30, 1929 |
| 1,053,512 | Huntoon et al. | Feb. 18, 1913 |
| 2,057,673 | Fields | Oct. 20, 1936 |

FOREIGN PATENTS

| Number | Country | Date |
| --- | --- | --- |
| 490,381 | Great Britain | Aug. 15, 1938 |

Certificate of Correction

Patent No. 2,423,492                          July 8, 1947

MURRY N. FAIRBANK

It is hereby certified that error appears in the printed specification of the above numbered patent requiring correction as follows:

Column 1, line 55, for "methyl" read *menthyl*;

and that the said Letters Patent should be read with this correction therein that the same may conform to the record of the case in the Patent Office.

Signed and sealed this 30th day of May, A. D. 1950.

[SEAL]

THOMAS F. MURPHY,
*Assistant Commissioner of Patents.*